US010075540B2

(12) United States Patent
Rajagopal et al.

(10) Patent No.: US 10,075,540 B2
(45) Date of Patent: *Sep. 11, 2018

(54) NETWORK FUNCTION VIRTUALIZATION (NFV) HARDWARE TRUST IN DATA COMMUNICATION SYSTEMS

(71) Applicant: Sprint Communications Company L.P., Overland Park, KS (US)

(72) Inventors: Arun Rajagopal, Leawood, KS (US); Lyle Walter Paczkowski, Mission Hills, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/815,031

(22) Filed: Nov. 16, 2017

(65) Prior Publication Data

US 2018/0084065 A1 Mar. 22, 2018

Related U.S. Application Data

(63) Continuation of application No. 14/753,536, filed on Jun. 29, 2015, now Pat. No. 9,854,048.

(51) Int. Cl.
*G06F 15/16* (2006.01)
*H04L 29/08* (2006.01)
(Continued)

(52) U.S. Cl.
CPC .......... *H04L 67/16* (2013.01); *G06F 9/45558* (2013.01); *H04L 41/28* (2013.01); *G06F 2009/45595* (2013.01)

(58) Field of Classification Search
CPC ....... G06F 9/45558; G06F 2009/45595; G06F 2009/4557; H04L 12/4641; H04L 67/10;
(Continued)

(56) References Cited

U.S. PATENT DOCUMENTS

2005/0114663 A1 5/2005 Cornell et al.
2014/0201374 A1 7/2014 Ashwood-Smith et al.
(Continued)

FOREIGN PATENT DOCUMENTS

WO 2015055102 4/2015

OTHER PUBLICATIONS

"Network Functions Virtualisation (NFV); Security Report; Security Monitoring for NFV Deployment [Release 2];" Draft ETSI GS NFV-SEC 008; Jun. 2015; pp. 1-33; V0.0.5; ETSI; Sophia Antipolis Cedex, France.
(Continued)

*Primary Examiner* — Djenane M Bayard

(57) ABSTRACT

A wireless User Equipment (UE) comprises a Network Function Virtualization Infrastructure (NFVI) that has hardware-trusted circuitry to support a hardware-trusted wireless communication service. A Network Function Virtualization Management and Orchestration (NFV MANO) orchestrator executes in the hardware-trusted circuitry and exchanges hardware trust data with a wireless communication network to maintain hardware-trust. The NFV MANO orchestrator also exchanges network operations data for the hardware-trusted wireless communication service with the wireless network over an Os-Nfvo link. Responsive to the exchange of the network operations data, the NFV MANO orchestrator exchanges network service data with the hardware-trusted circuitry in the NFVI over an Nf-Vi link to execute an NFV Virtual Network Function (VNF) to support the hardware-trusted wireless communication service. Responsive to the exchange of the network service data, the hardware-trusted circuitry in the NFVI executes the NFV VNF to support the hardware-trusted wireless communication service.

20 Claims, 5 Drawing Sheets

(51) Int. Cl.
*H04L 12/24* (2006.01)
*G06F 9/455* (2018.01)

(58) Field of Classification Search
CPC . H04L 41/0896; H04L 41/5054; H04L 41/12; H04L 67/16; H04L 41/5051; H04L 41/5096; H04L 12/28; H04L 12/6418; H04L 12/66; H04L 41/0893; H04L 41/20
See application file for complete search history.

(56) References Cited

U.S. PATENT DOCUMENTS

| | | |
|---|---|---|
| 2014/0229945 A1 | 8/2014 | Barkai et al. |
| 2014/0317261 A1 | 10/2014 | Shatzkamer et al. |
| 2015/0063166 A1 | 3/2015 | Sif et al. |
| 2015/0288541 A1 | 10/2015 | Fargano et al. |
| 2016/0226913 A1* | 8/2016 | Sood ................. H04L 63/20 |
| 2016/0330613 A1 | 11/2016 | Cook et al. |
| 2016/0373474 A1* | 12/2016 | Sood ................. H04L 63/1425 |
| 2017/0308395 A1* | 10/2017 | Cook ................. G06F 9/45558 |

OTHER PUBLICATIONS

"Network Functions Virtualisation (NFV); Management and Orchestration;" ETSI GS NFV-MAN 001; Dec. 2014; pp. 1-184; V1.1.1; ETSI; Sophia Antipolis Cedex, France.
"NFV Security in 3GPP;" 3GPP TSG-SA3 Meeting #75; May 12-16, 2014; pp. 1-18; S3-140872; 3GPP; Sapporo, Japan.
"VNF Certificate Generation;" Huawei Technologies; ETSI NFVSEC(15)000131; May 11, 2015; pp. 1-5; ETSI; Sophia Antipolis Cedex, France.

* cited by examiner

US 10,075,540 B2

NETWORK FUNCTION VIRTUALIZATION (NFV) HARDWARE TRUST IN DATA COMMUNICATION SYSTEMS

RELATED CASES

This patent application is a continuation of U.S. patent application Ser. No. 14/753,536 that was filed on Jun. 29, 2015 and is entitled "NETWORK FUNCTION VIRTUALIZATION (NFV) HARDWARE TRUST IN DATA COMMUNICATION SYSTEMS." U.S. patent application Ser. No. 14/753,536 is hereby incorporated by reference into this patent application.

TECHNICAL BACKGROUND

Data communication networks operate computer systems to provide various data services. The data services include internet access, media conferencing, file access, messaging, content delivery, and the like. The computer systems execute networking software to forward data packets for the data services. These computer systems increasingly use Network Function Virtualization (NFV) data processing infrastructures to execute the networking software.

The NFV Infrastructures (NFVIs) distribute the execution of the networking software across various processing cores, time cycles, memories, and I/O ports. The networking software comprises Virtual Network Functions (VNFs) that are installed, executed, and terminated as new data services are introduced and replaced. Likewise, the NFVI undergoes change as the processing cores, memories, I/O ports, and hypervisor software are also introduced and replaced. This dynamically changing NFVI environment is controlled by an NFV Management and Orchestration (MANO) data communication system.

The NFV MANO system drives the NFVI to support a various network services. For a given Network Service (NS), the NFV MANO system receives data from network operations and responsively transfers network data to the NFVI. In response to the network data, the NFVI executes the proper VNFs using the appropriate NFVI processing cores, time cycles, memories, and I/O ports to support delivery of the NS.

Unfortunately, the NFVIs do not effectively integrate general-purpose NFVI systems with hardware-trusted NFVI systems. Moreover, the general-purpose NFVI systems and the hardware-trusted NFVI systems do not efficiently share VNFs. Unfortunately, NFV MANO systems do not efficiently share VNFs across the hardware-trust boundaries in the NFVIs.

TECHNICAL OVERVIEW

A wireless User Equipment (UE) comprises a Network Function Virtualization Infrastructure (NFVI) that has hardware-trusted circuitry to support a hardware-trusted wireless communication service. A Network Function Virtualization Management and Orchestration (NFV MANO) orchestrator executes in the hardware-trusted circuitry and exchanges hardware trust data with a wireless communication network to maintain hardware-trust. The NFV MANO orchestrator also exchanges network operations data for the hardware-trusted wireless communication service with the wireless network over an Os-Nfvo link. Responsive to the exchange of the network operations data, the NFV MANO orchestrator exchanges network service data with the hardware-trusted circuitry in the NFVI over an Nf-Vi link to execute an NFV Virtual Network Function (VNF) to support the hardware-trusted wireless communication service. Responsive to the exchange of the network service data, the hardware-trusted circuitry in the NFVI executes the NFV VNF to support the hardware-trusted wireless communication service.

DETAILED DESCRIPTION

Figure 1:
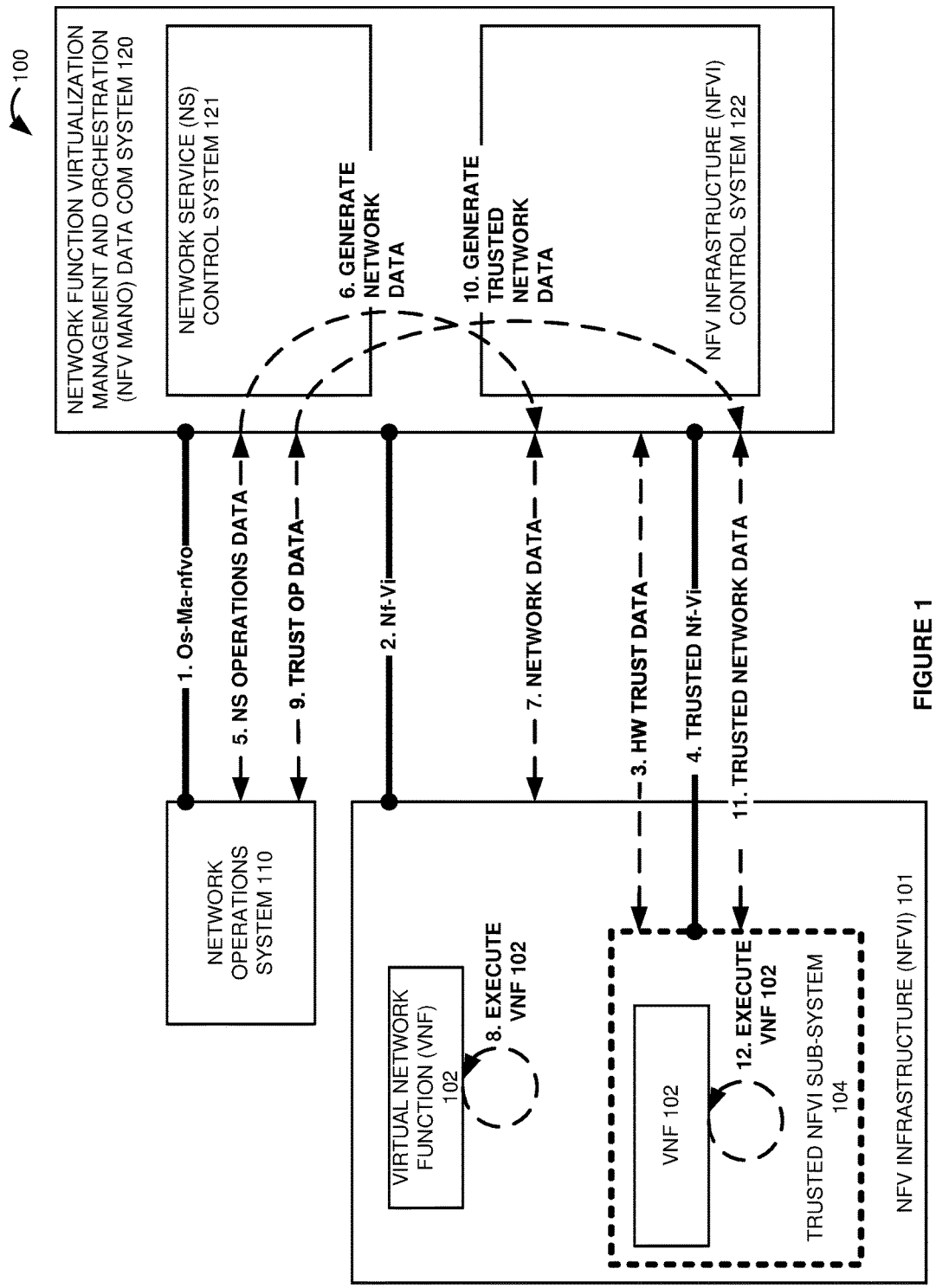
FIG. 1 illustrates a Network Function Virtualization (NFV) system to support a Network Service (NS) using a Virtual Network Function (VNF).

FIG. 1 illustrates Network Function Virtualization (NFV) system 100 to support a Network Service (NS) using Virtual Network Function (VNF) 102. The NS might be video conferencing, multimedia messaging, Internet access, or some other data communication service. NFV system 100 comprises NFV Infrastructure (NFVI) 101, network operations system 110, and NFV MANO data communication system 120. NFV MANO data communication system 120 includes NS control system 121 that comprises NFV Orchestration (NFVO) software and associated hardware. NFVI control system 122 that comprises VNF Manager (VNFM) and Virtualized Infrastructure Manager (VIM) software and associated hardware. Network operations system 110 and NFV MANO system 120 both comprise computer systems and software that may be discrete, shared, or hosted by another NFVI. For the typical NS, VNF 102 is chained to other VNFs and possibly to Physical Network Function (PNFs) by Virtual Links (VLs) based on VNF Forwarding Graphs (VNFFGs).

NFVI 101 comprises computer circuitry, data memories, communication interfaces, and software. The software includes hardware-trust systems, hypervisors, operating systems, VNFs, network operations, and the like. NFVI 101 includes hardware-trusted subsystem 104 that comprises special processing circuitry having a secret hardware-embedded key. NFVI subsystem 104 may also include data memories and communication interfaces that may also have their own secret hardware-embedded keys. NFVI subsystem 104 executes hardware-trust software to encode data with the secret hardware-embedded keys for remote validation of hardware-trusted subsystem 104.

NFVI 101 allocates its data processing resources among various software components. For example, an NFVI hypervisor may drive eight Central Processing Unit (CPU) cores to execute multiple VNFs in parallel and at pre-scheduled times. The NFVI hypervisor may also allocate data specific memories and communication interfaces to the executing VNFs. NFVI 101 typically sub-divides its data processing resources in the time domain using context switching and allocates the resulting data processing time slices to the VNFs. The NS may use one or more of these dedicated NFVI time slices. Network operations system 110, NFV MANO system 120, and/or hardware-trusted subsystem 104 may also use one or more dedicated NFVI time slices.

In a first operation, network operations system 110 and NFV MANO data communication system 120 establish an Os-Ma-nfvo link. The Os-Ma-nfvo link is used to exchange operations data for the NS. The operations data indicates VNFs for the NS and other service parameters, such as NFVI resource requirements. In a second operation, NFVI 101 and NFV MANO data communication system 120 establish an Nf-Vi link. The Nf-Vi link is used to exchange network data for the NS. The network data indicates VNFs and their NFVI resource requirements for the NS.

In a third operation, trusted subsystem 104 in NFVI 101 and NFV MANO data communication system 120 exchange hardware-trust data. The hardware-trust data includes the encoded data that was encoded with the secret hardware key embedded in subsystem 104. NFV MANO data communication system 120 generates its own version of the encoded data using its own version of the secret key. NFV MANO data communication system 120 matches the two forms of the encoded data to maintain the hardware-trust of NFVI subsystem 104. In some examples, NFV MANO data communication system 120 uses network operations system 110 or another computer system to assist in the above hardware-trust validation.

In a fourth operation, hardware-trusted subsystem 104 and NFV MANO data communication system 120 establish a trusted Nf-Vi link. The trusted Nf-Vi link is used to exchange network data for the NS. The network data indicates VNFs and NFVI subsystem resource requirements for the NS. Note that operations three and four may be integrated so that hardware-trust data exchange occurs over the Nf-Vi links between NFVI 101 or its sub-system 104 and MANO system 120.

In a fifth operation, network operations system 110 and NFV MANO data communication system 120 exchange NS operation data for the NS with over the Os-Ma-nfvo link. The NS operation data includes parameters and instructions for the NS including an instruction to execute VNF 102 and the NFVI resources required by VNF 102. In some examples, VNF 102 comprises a virtual network element like a Base-Band Unit (BBU) or a Packet Data Network Gateway (P-GW).

In a sixth operation, NFV MANO system 120 processes the NS operation data to generate network data. The network data will drive NFVI 101 to execute VNF 102 externally to hardware-trusted subsystem 104 using the required NFVI resources to support the NS. In a seventh operation, NFV MANO system 120 transfers the network data to NFVI 101 over the Nf-Vi link. The network data will drive NFVI 101 to execute VNF 102 externally to hardware-trusted subsystem 104 using the required NFVI resources to support the NS. In an eighth operation, NFVI 101 processes the network data to execute VNF 102 externally to hardware-trusted subsystem 104 using the required NFVI resources to support the NS.

In a ninth operation, network operations system 110 and NFV MANO data communication system 120 exchange trust operation data for the NFV NS with over the Os-Ma-nfvo link. The trust operation data includes parameters and instructions for the NS including an instruction to execute VNF 102 in hardware-trusted subsystem 104 and the NFVI subsystem resources required by VNF 102.

In a tenth operation, NFV MANO system 120 processes the trust operation data to generate trusted network data. The trusted network data will drive trusted subsystem 104 in NFVI 101 to execute VNF 102 using the required NFVI resources to support the NS. In an eleventh operation, NFV MANO system 120 transfers the trusted network data to trusted subsystem 104 in NFVI 101. The trusted network data will drive trusted subsystem 104 to execute VNF 102 using the required NFVI resources to support the NS. In a twelfth operation, trusted subsystem 104 in NFVI 101 processes the trusted network data to execute VNF 102 using the required NFVI resources to support the NS.

Advantageously, NFV system 100 executes VNF 102 in the general-purpose hardware systems of NFVI 101 that are external to hardware-trusted subsystem 104. When required, NFV system 100 executes VNF 102 in hardware-trusted subsystem 104. In NFVI 101, the general-purpose and hardware-trusted systems efficiently and effectively share VNF 102. The efficient integration of general NFVI and trusted NFVI is achieved through sharing VNFs to enable the cost-effective delivery of highly-secure data communication services. In exemplary scenarios, NFV system 100 could deliver enhanced video conferencing, multimedia messaging, Internet access, and the like.

Figure 2:
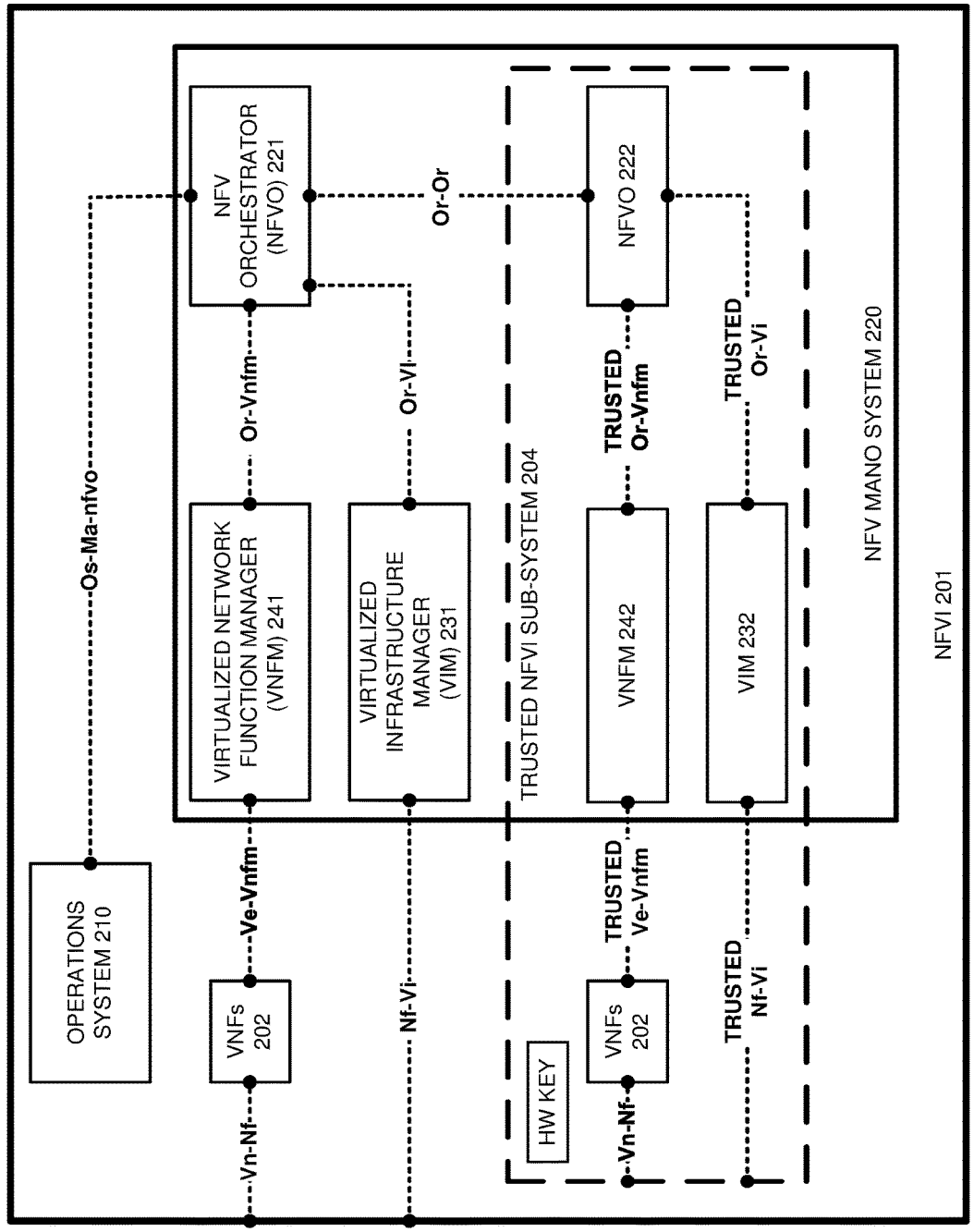
FIGS. 2-3 illustrate an NFV Infrastructure (NFVI) to support an NS using VNFs.
Figure 3:
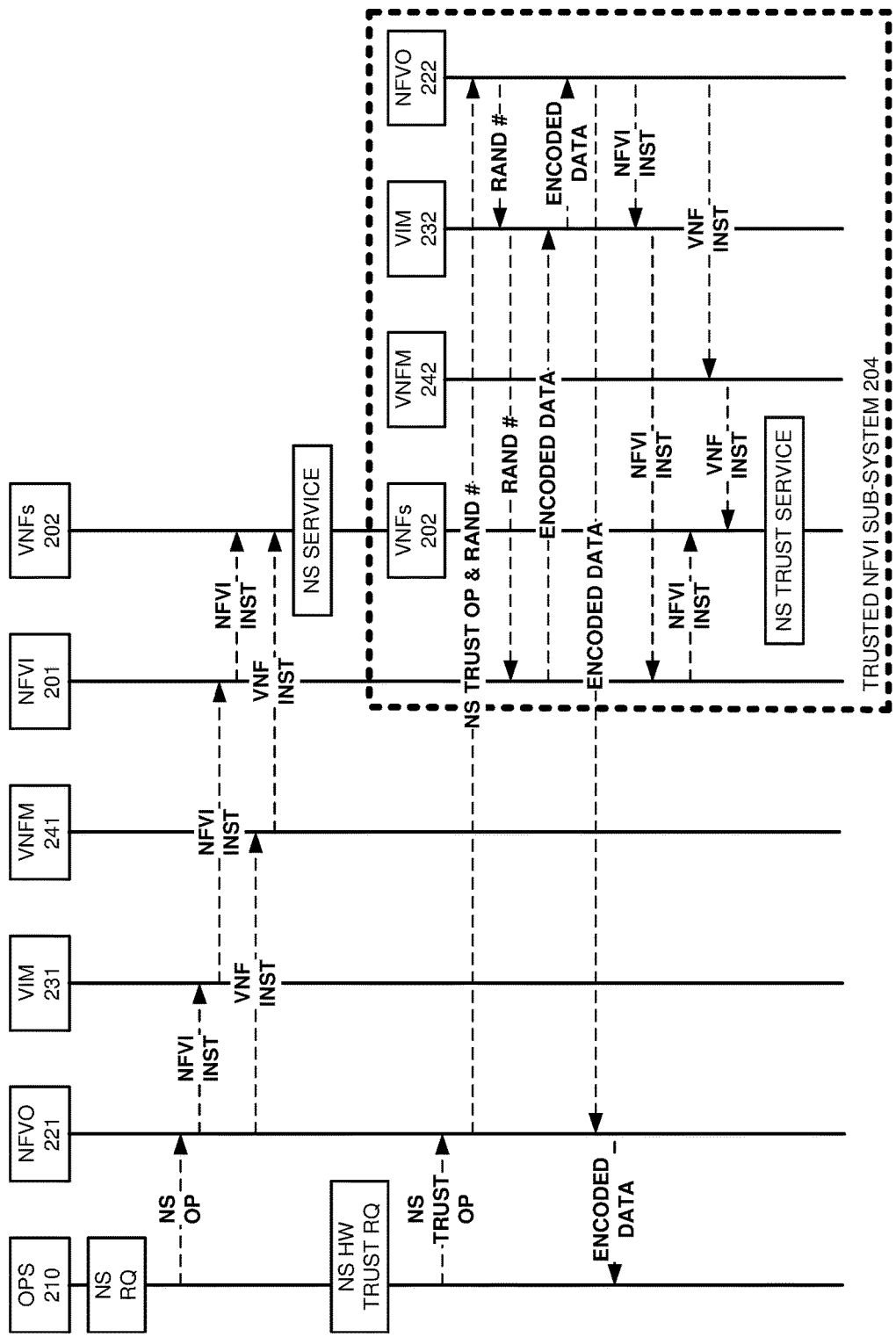

FIGS. 2-3 illustrate Network Function Virtualization Infrastructure (NFVI) 201 to support a Network Service (NS) using Virtual Network Functions (VNFs) 202. NFVI 201 is an example of NFV system 100, although system 100 may have different configurations and operations. NFVI system 201 comprises VNFs 202, operations system 210, and NFV Management and Orchestration (MANO) system 220. NFVI 201 comprises computer circuitry, data memories, communication network interfaces, and software. The software includes hardware-trust systems, hypervisors and virtual switches, operating systems, VNFs, network applications, and the like. In this example, operations system 210 and NFV MANO system 220 are hosted by NFVI 201. In other examples, systems 210 and 220 may be discrete computer systems and software or they may be hosted by another NFVI.

NFVI 201 includes hardware-trusted subsystem 204 that comprises special processing circuitry, data memory, and transceivers that share a secret hardware-embedded key, although the memories and interfaces could have their own keys. NFVI subsystem 204 executes hardware-trust software to generate encoded data based on the secret hardware-embedded key(s) to transfer for remote hardware-trust validation of subsystem 204.

NFV MANO system 220 comprises NFV Orchestrators (NFVOs) 221-222, VNF Managers (VNFMs) 231-232, and Virtualized Infrastructure Managers (VIMs) 241-242. Externally to hardware-trusted subsystem 204, NFVI 201 exchanges data among its components over logical NFV links that traverse the physical hardware in NFVI 201. Operations system 210 and NFVO 221 communicate over an Os-Ms-nfvo link. NFVO 221 and VNFM 241 communicate over an Or-Vnfm link. VNFM 241 and VNFs 202 communicate over a Ve-Vnfm link. NFVO 221 and VIM 231 communicate over an Or-Vi link. VIM 231 and NFVI 201 communicate over an Nf-Vi link.

Hardware-trusted subsystem 204 exchanges data among its trusted components over logical NFV links that traverse the physical hardware in subsystem 204. NFVO 222 and VNFM 242 communicate over a trusted Or-Vnfm link. VNFM 241 and VNFs 202 communicate over trusted Ve-Vnfm links. NFVO 222 and VIM 232 communicate over a trusted Or-Vi link. VIM 232 and trusted NFVI subsystem 204 communicate over a trusted Nf-Vi link. NFVO 221 and NFVO 222 communicate over an Or-Or link that traverses the boundary between trusted subsystem 204 and the general-purpose hardware in NFVI 201. The hardware-trust boundary crossing comprises a hardware-trust data bus that strictly controls software and data access to NFVI subsystem 204 and NFVO 222.

NFVOs 221-222 handle NS lifecycle management. NS lifecycle management includes the registration, cataloging, instantiation, updating, scaling, and termination of the NS and its associated VNFs and VLs. NFVOs 221-222 manage the associations between VNFs and between VNFs/PNFs based on the NS topology as specified in the NS VNFFG. Scaling comprises modifying the capacity of the NS by changing its hardware allocation or its virtual resources. For example, a scaling control might restrict the number of VLs allowed between two VNFs to trigger more VLs or a change to the VNFFG. Scaling requires the monitoring of various key performance indicators to trigger NS modifications. NS lifecycle management is controlled by NS templates that indicate VNFs, PNFs, VNFFGs, parameters, and policies. VNF lifecycle management is controlled by similar VNF templates. NFVOs 221-222 process NFVI resource requests from VNFMs 241-242 based on NFVI resource data from VIMs 231-232 and on operations system 210 instructions, the NS/NFV templates, and descriptors. NFVOs 221-222 collect NFVI resource performance and usage information. NFVOs 221-222 may instantiate and link VIMs 231-232 and VNFMs 241-242 to implement the NS.

VNFMs 241-242 handle VNF lifecycle management. VNF lifecycle management includes the instantiation, updating, scaling, and termination of the VNFs. Scaling comprises modifying the capacity of the VNF by changing its hardware allocation or its virtual resources. Scaling requires the monitoring of various performance indicators to trigger NFVI/VNF modifications. VNFMs 241-242 control the VNF lifecycles with VNF templates that indicate VNF Descriptors (VNFDs), parameters, and policies. The VNFDs typically indicate the ability of a specific VNF to be deployed both internally and externally to subsystem 204. VNFMs 241-242 also request and release NFVI resources for VNFs 202 from NFVOs 221-222. VNFMs 241-242 collect VNF 202 performance and usage information.

VIMs 231-232 control the allocation of NFVI 201 to support the NS. VIMs 231-232 typically comprise Software-Defined Network (SDN) controllers that expose northbound interfaces to NFVOs 221-222 and have southbound interfaces from to and controllers in NFVI 201 and subsystem 204. VIMs 231-232 broker the allocation, modification, and release of NFVI resources. VIMs 231-232 manage the association of the virtual resources to physical resources based on the VNFFGs. VIMs 231-232 report NFVI resources, performance, and usage.

The Os-Ma-nfvo link transports various data for the NS and its VNFs including templates and descriptors, instantiation data, scaling data, NFVI performance and usage data, termination data, and other pertinent information. The Or-Or link transports data for the NS and VNFs 202 including templates, descriptors, instantiation data, scaling data, performance data, termination data, NFVI reservations, allocations, usage, and releases. The Or-Vnfm links and the Ve-Vnfm links transport data for VNFs 202 indicating NFVI reservations, NFVI authorizations, NFVI releases, VNF instantiations, VNF queries, VNF updates, VNF scaling, and VNF termination. The Or-Vi links and the Nf-Vi links transport data indicating NFVI reservations, allocations, releases, updates, performance measurements, and usage records. Although not shown for clarity, VIM 231 and VNFM 241 communicate over a Vi-Vnfm link that transports data related to NFVI resources, VNF requirements, configuration information, and the like. VIM 232 and VNFM 242 communicate over a trusted Vi-Vnfm link.

Referring to FIG. 3, network operations system (OPS) 210 transfers operations data for the NS to NFVO 221. The operations data indicates VNFs 202 for the NS and other service parameters, such as NS and NFV templates, forwarding graphs, and descriptors. In some examples, VNFs 202 comprise virtual Network Elements (vNEs) for data communication networks like Long Term Evolution (LTE), Wireless Fidelity (WiFi), Data Over Cable Service Interface Specification (DOCSIS), Dense Wavelength Division Multiplexing (DWDM), Internet Protocol (IP), and Ethernet.

Responsive to the operations data, NFVO 221 transfers NFVI instructions for the NS to VIM 231. The NFVI instructions indicate NS service parameters, forwarding graphs (having VNFs 202), and NFVI resource requirements. Responsive to the NFVI instructions, VIM 231 transfers NFVI instructions for the NS to NFVI 201. The NFVI instructions indicate VNFs 202, VLs, PNFs, and NFVI resource requirements. Responsive to the NFVI instructions, NFVI 201 instantiates VNFs 202 outside of trusted subsystem 204 per the NFVI instructions.

Contemporaneously and responsive to the operations data, NFVO 221 transfers VNF instructions for the NS to VNFM 241. The VNF instructions indicate NS service parameters, VNF 202 templates and descriptors, and NFVI resource requirements for the NS/VNFs. Responsive to the VNF instructions, VNFM 241 transfers VNF instructions to executing VNFs 202. The VNF instructions indicate NS service parameters, VNF template and descriptor data, and NFVI resource requirements. VNFs 202 process the VNF instructions to support the NS.

Subsequently, network operations system (OPS) 210 transfers hardware trust operations data for the NS to NFVO 221. The NS trust operation is triggered by the need to temporarily shift the data communications for the NS into a hardware-trusted NFVI subsystem. For example, a manufacturing machine and its control server may exchange status data over general purpose NFVI resources, but the manufacturing machine and the control server may only use hardware-trusted NFVI resources for critical machine operations. The trust operations data indicates VNFs 202, NS trust parameters, and NFVI 201 resource requirements including the use of hardware-trusted subsystem 204. The trust operations data includes a random number for hardware-trust verification. Responsive to the trust operations data, NFVO 221 transfers the trust operations data to trusted NFVO 222. The trust operations data includes a flag, header, marker, or other data that drives NFVO 221 to transfer the trust operations data to trusted NFVO 222 through a hardware-trust bus interface. The trust operations data includes the random number for hardware-trust verification.

Responsive to the trust operations data, trusted NVFO 222 transfers hardware trust instructions to trusted VIM 232 that indicate the random number for hardware-trust verification. Responsive to the hardware-trust instructions, trusted VIM 232 transfers hardware-trust instructions to hardware-trusted subsystem 204 in NFVI 201. The hardware-trust instructions indicate the random number for hardware-trust verification. Responsive to the hardware-trust instructions, trusted subsystem 204 processes the random number with its secret hardware-embedded key to generate and transfer encoded data to trusted VIM 232. Trusted VIM 232 transfers the encoded data to trusted NFVO 222. Trusted NFVO 222 transfers the encoded data to NFVO 221, and NFVO 221 transfers the encoded data to network operations system (OPS) 210. Network operations system (OPS) 210 uses its own version of the secret key and the random number to match the encoded data and verify the hardware-trust in subsystem 204 of NFVI 201. Thus, NFVI 201 exchanges hardware-trust random number challenges and encoded data responses over the NFV links: Os-Ma-nfvo, Or-Or, Or-Vi, and Nf-Vi.

Also in response to the trust operations data, trusted NVFO 222 transfers NFVI instructions for the NS to trusted VIM 241. The NFVI instructions indicate NS service parameters, forwarding graphs (having VNFs 202), and NFVI resource requirements. Responsive to the NFVI instructions, VIM 241 transfers NFVI instructions for the NS to hardware-trusted subsystem 204 in NFVI 201. The NFVI instructions indicate VNFs 202, VLs, PNFs, and other NFVI resource requirements. Responsive to the NFVI instructions, subsystem 204 in NFVI 201 instantiates VNFs 202 and the VLs per the NFVI instructions.

Contemporaneously and responsive to the operations data, NFVO 222 transfers VNF instructions for the NS to trusted VNFM 241. The VNF instructions indicate NS service parameters, VNF 202 templates and descriptors, and NFVI resource requirements for the NS and VNFs 202. Responsive to the VNF instructions, trusted VNFM 241 transfers VNF instructions to executing VNFs 202. The VNF instructions indicate NS service parameters, VNF template and descriptor data, and NFVI resource requirements. VNFs 202 process the VNF instructions to support the NS from within hardware-trusted subsystem 204.

Advantageously, NFVI 201 efficiently uses NFV MANO components and links to exchange hardware-trust information between NFVI subsystem 204 and operations system 210. NFVI 201 uses the hardware-trusted subsystem 204 when instructed by operations system 210 and NFVI 201 allows hardware-trust validation through periodic testing, on-demand challenges, or triggers in the NS and VNF templates and descriptors. By avoiding the costs of duplicating VNF software, VNF sharing between general-purpose hardware and more-expensive trusted hardware enables the cost-effective delivery of highly-secure data communication services like file transfers, video conferencing, and machine control.

Figure 4:
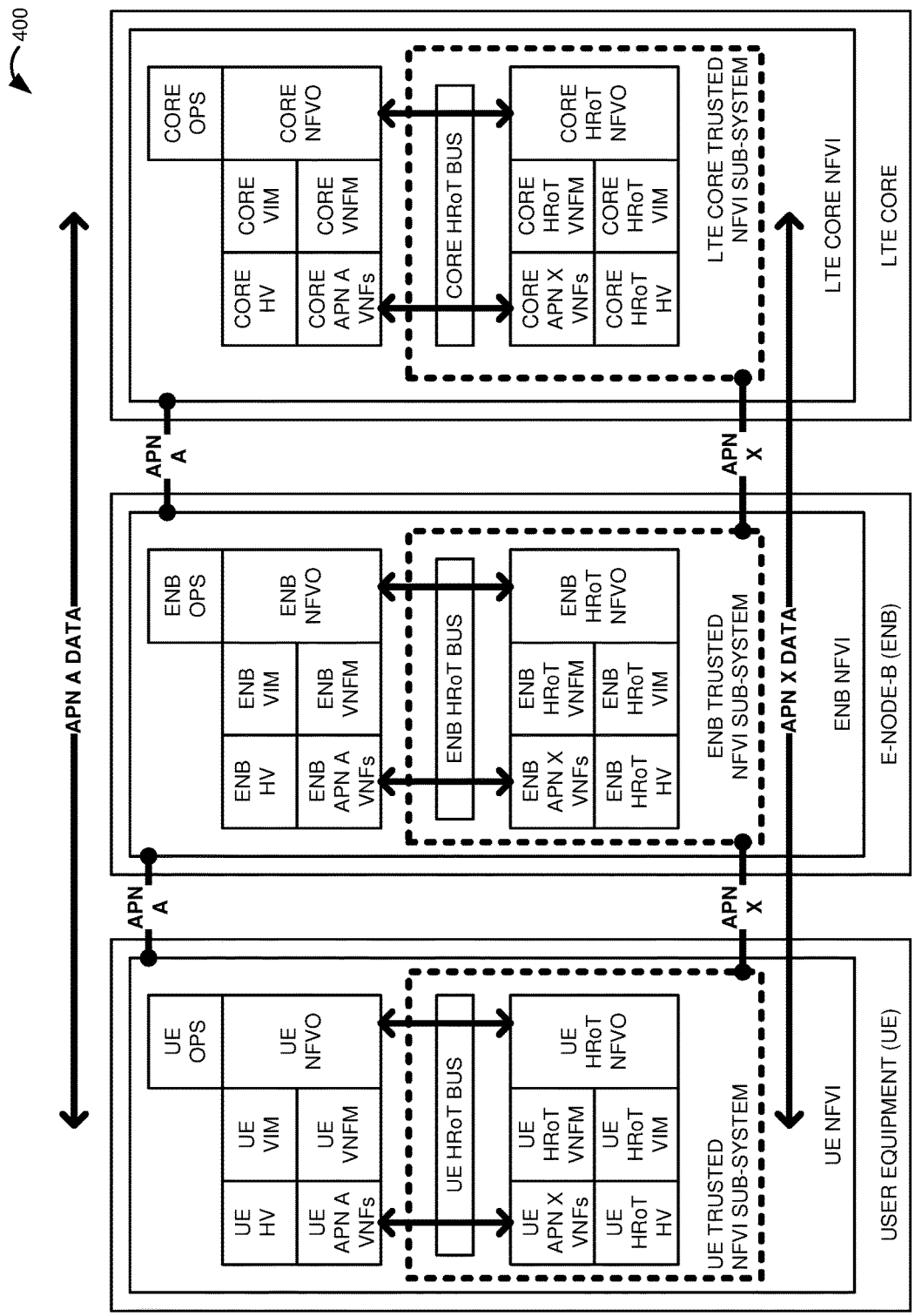
FIG. 4 illustrates a Long Term Evolution (LTE) communication system to support an NS with VNFs in a distributed NFVI.

FIG. 4 illustrates Long Term Evolution (LTE) communication system 400 to support a Network Service (NS) with Virtual Network Functions (VNFs) in a distributed Network Function Virtualization Infrastructure (NFVI). LTE communication system 400 is an example of NFV system 100 and NFVI 201, although these systems may use differing configurations and operations. LTE communication system 400 comprises User Equipment (UE), an eNodeB (eNB), and an LTE core. The UE could be a phone, computer, intelligent machine, or the like. The eNB could be a femto-cell, small-cell, relay, macrocell, or some other LTE wireless access point. The LTE core chains its VNFs to make network elements such as a Service Gateway (S-GW), Packet Data Network Gateway (P-GW), Mobility Management Entity (MME), Home Subscriber System (HSS), Policy Charging and Rules Function (PCRF), and/or Internet Multimedia Subsystem (IMS).

LTE communication system 400 uses Access Point Names (APNs) to establish mobile IP anchors for the UE and to configure IP tunnels between the mobile IP anchors and the UE. LTE communications network 400 uses "APN A" for a service like internet access or voice calling. LTE communications network 400 uses "APN X" for a trusted extension to the service like a hardware-trusted transaction during a generic internet session or an on-demand hardware-trusted voice call in between other generic voice calls.

The LTE core NFVI comprises a core Hypervisor (HV), core VNFs for APN A, core operations system, core NFVO, core VIM, and core VNFM. The LTE core NFVI also comprises a Hardware Root of Trust (HRoT) subsystem. The LTE core HRoT subsystem comprises an HRoT bus, HRoT HV, HRoT VNFs for APN X, HRoT NFVO, HRoT VIM, and HRoT VNFM.

The eNB NFVI comprises an eNB Hypervisor (HV), eNB VNFs for APN A, eNB operations system, eNB NFVO, eNB VIM, and eNB VNFM. The eNB NFVI also comprises an HRoT subsystem. The eNB HRoT subsystem comprises an HRoT bus, HRoT HV, HRoT VNFs for APN X, HRoT NFVO, HRoT VIM, and HRoT VNFM.

The UE NFVI comprises a UE HV, UE VNFs for APN A, UE operations system, UE NFVO, UE VIM, and UE VNFM. The UE NFVI also comprises an HRoT subsystem. The UE HRoT subsystem comprises an HRoT bus, HRoT HV, HRoT VNFs for APN X, HRoT NFVO, HRoT VIM, and HRoT VNFM.

The UE NFVI and the eNB NFVI are communicatively coupled over APN A data bearers. Likewise, the eNB NFVI and the LTE core NFVI are communicatively coupled over APN A data bearers. Thus, the UE communicates through the LTE core over APN A connections. In the hardware-trusted subsystems, the trusted UE subsystem and the trusted eNB subsystem are communicatively coupled over APN X data bearers. Likewise, the trusted eNB subsystem and the trusted LTE core subsystem are communicatively coupled over APN X data bearers. Thus, the UE also communicates through the LTE core over hardware-trusted APN X data bearers.

In the LTE core NFVI, the NFVOs are coupled through the core HRoT bus. Responsive to a request from the core operations system, the LTE core NFVOs initiate the transfer of LTE core VNFs through the core HRoT bus to efficiently share VNF software packages between the core NFVI and its HRoT subsystem. In the eNB NFVI, the NFVOs are coupled through the eNB HRoT bus. Responsive to a request from the eNB operations system, the eNB NFVOs initiate the transfer of eNB VNFs through the eNB HRoT bus to efficiently share VNF software packages between the eNB NFVI and its HRoT subsystem. In the UE NFVI, the NFVOs are coupled through the UE HRoT bus. Responsive to a request from the UE operations system, the UE NFVOs initiate the transfer of UE VNFs through the UE HRoT bus to efficiently share VNF software packages between the UE NFVI and its HRoT subsystem. The operations systems exchange APN data over APN A links to coordinate simultaneous APN A/X switching across the UE, eNB, and LTE core. The NFVOs also exchange NFVI data over APN X links to coordinate simultaneous APN A/X switching across the UE, eNB, and LTE core.

In one exemplary data session, the UE may interact with a medical server over APN A to transfer various data. If the UE operations system detects the need to transfer sensitive medical data to the medical server, then the UE operations system triggers a switch from APN A to APN X through the UE NFVOs. The UE operations system and the UE NFVOs coordinate the APN switch and the switch back through the eNB and LTE core. The UE transfers the sensitive medical data to the medical server over APN X and then reverts to APN A.

In another exemplary data session, the UE may interact with a video server over APN A to download video. When the video server needs to deliver highly-secure video decryption keys to the UE, it directs the core operations system to switch from APN A to APN X. The LTE core operations system and the core NFVOs coordinate the APN switch and the switch back through the eNB and UE. The video server transfers the decryption keys to the UE over APN X and then reverts to APN A.

In either example, the HRoT NFVOs direct the HRoT VIMs to direct HRoT HVs to retrieve VNFs (used for APN A) across the HRoT bus and to execute these VNFs in the hardware-trusted subsystems for APN X. Thus, the VNFs executing in the general-purpose NFVI are accessed with APN A, and the same VNFs executing in the hardware-trusted subsystem are accessed with APN X.

Figure 5:
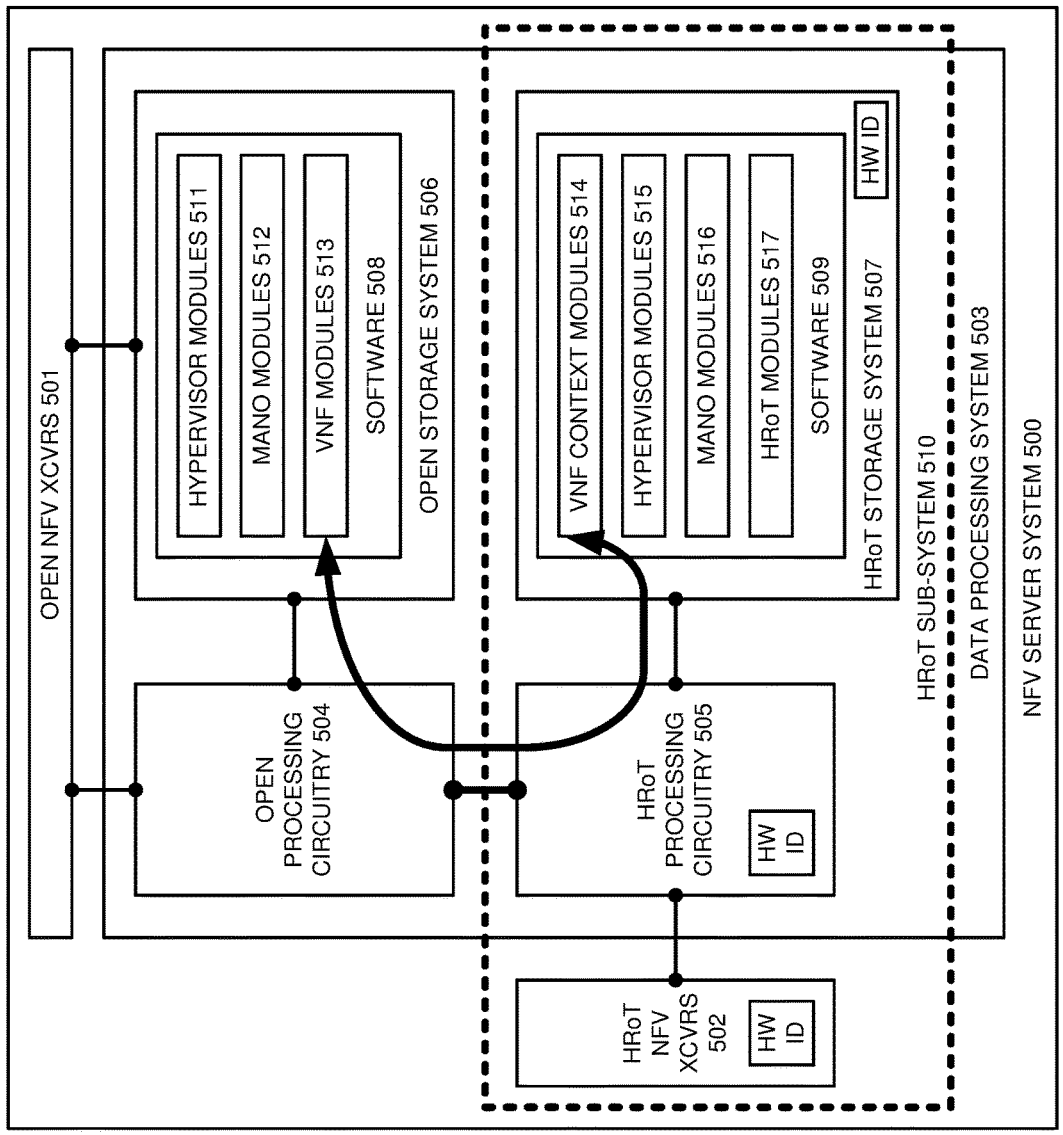
FIG. 5 illustrates an NFV server system to support an NS in an NFVI with VNFs.

FIG. 5 illustrates Network Function Virtualization (NFV) server system 500 to support a Network Service (NS) in an NFV Infrastructure (NFVI) with Virtual Network Functions (VNFs). NFV server system 500 is an example of systems 100, 201, and 400, although these systems may use alternative configurations and operations. NFV server system 500 comprises open NFV transceivers 501 and Hardware Root of Trust (HRoT) NFV transceivers 502. NFV transceivers 501-502 comprise communication components, such as ports, bus interfaces, signal processors, memory, software, and the like. NFV transceivers 501-502 exchange user data communications with various systems and devices.

NFV server system 500 comprises data processing system 503. Data processing system 503 comprises open processing circuitry 504 and HRoT processing circuitry 505. Data processing system 503 comprises open storage system 506 and HRoT storage system 507. Storage systems 506-507 store software 508-509. Software 508-509 includes software modules 511-517. Some conventional aspects of NFV server system 500 are omitted for clarity, such as power supplies, enclosures, and the like. NFV server system 500 may be centralized or distributed and includes various virtualized components.

In data processing system 503, processing circuitry 504-505 comprises server blades, circuit boards, bus interfaces, integrated circuitry, and associated electronics. Storage systems 506-507 comprises non-transitory, machine-readable, data storage media, such as flash drives, disc drives, memory circuitry, tape drives, servers, and the like. Software 511-517 comprises machine-readable instructions that control the operation of processing circuitry 504-505 when executed. Software 508-509 includes software modules 511-517 and may also include operating systems, applications, data structures, virtual network elements, utilities, and the like. All or portions of software 508-509 may be externally stored on one or more storage media, such as circuitry, discs, tape, and the like.

HRoT subsystem 510 comprises HRoT NFV transceivers 502, HRoT processing circuitry 505, HRoT storage system 509, and HRoT communication links. HRoT NFV transceivers 502, HRoT processing circuitry 505, and HRoT storage system 507 each have a secret hardware-embedded ID for remote hardware-trust validation. Internal data exchanges with HRoT subsystem 510 occur over a secure HRoT bus between open processing circuitry 504 and HRoT processing circuitry 505. As indicated by the arrows, VNF software modules 513 traverse this HRoT boundary. HRoT validation data and other NFV Or-Or link data also traverse this HRoT boundary.

When executed by open processing circuitry 504, hypervisor modules 511 direct circuitry 504 to create an open NFVI and provide NFV data reporting. When executed by open processing circuitry 504, MANO modules 512 direct circuitry 504 to manage and orchestrate the open NFVI— including the transfer of NS/VNF execution from open hardware to HRoT hardware. When executed by open processing circuitry 504, VNF data modules 513 direct circuitry 504 to perform data processing tasks to support the NS like data routing, quality-of-service management, media coding, and the like.

When executed by HRoT processing circuitry 505, VNF context modules 514 direct circuitry 505 to provide an interface and configuration information for VNF modules 513 when executing in circuitry 505 in HRoT subsystem 510—including software integrity scanning. When executed by HRoT processing circuitry 505, hypervisor modules 515 direct circuitry 505 to create HRoT NFVI subsystem 510 and provide NFV data reporting. When executed by HRoT processing circuitry 505, MANO modules 516 direct circuitry 505 to manage and orchestrate the HRoT NFVI— including the transfer of NS/VNF execution from open hardware to HRoT hardware. When executed by HRoT processing circuitry 505, HRoT modules 517 direct circuitry 505 to handle hardware trust validations, queries, and coordination.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating wireless User Equipment (UE) that comprises a Network Function Virtualization Infrastructure (NFVI) that has hardware-trusted circuitry to support a hardware-trusted wireless communication service, the method comprising:
    a Network Function Virtualization Management and Orchestration (NFV MANO) orchestrator executing in the hardware-trusted circuitry in the NFVI and responsively exchanging hardware trust data with a wireless communication network to maintain hardware-trust between the wireless UE and the wireless communication network;
    the NFV MANO orchestrator executing in the hardware-trusted circuitry in the NFVI and responsively exchanging network operations data for the hardware-trusted wireless communication service with the wireless network over an Os-Nfvo link;
    responsive to the exchange of the network operations data, the NFV MANO orchestrator exchanging network service data with the hardware-trusted circuitry in the NFVI over an Nf-Vi link to execute an NFV Virtual Network Function (VNF) to support the hardware-trusted wireless communication service; and
    responsive to the exchange of the network service data, the hardware-trusted circuitry in the NFVI executing the NFV VNF to support the hardware-trusted wireless communication service.

2. The method of claim 1 wherein:
    the hardware-trusted circuitry in the NFVI has a physically-embedded secret key; and
    the NFV MANO orchestrator exchanging the hardware trust data with the wireless communication network comprises the NFV MANO orchestrator encoding some of the hardware trust data with the physically-embedded secret key.

3. The method of claim 1 wherein the NFV MANO orchestrator exchanging the hardware trust data with the wireless communication network comprises exchanging the hardware trust data over the Os-Nfvo link.

4. The method of claim 1 further comprising:
a Virtualized Infrastructure Manager (VIM) executing in the hardware-trusted circuitry in the NFVI and wherein the NFV MANO orchestrator exchanging the network service data with the hardware-trusted circuitry over the Nf-Vi link comprises:
the NFV MANO orchestrator exchanging the network service data with the VIM over an Or-Vi link; and
the VIM exchanging the network service data with the hardware-trusted circuitry over the Nf-Vi link.

5. The method of claim 1 further comprising:
a Virtualized Infrastructure Manager (VIM) executing in the hardware-trusted circuitry in NFVI;
the NFV MANO orchestrator exchanging a portion of the hardware trust data with the VIM over an Or-Vi link; and
the VIM exchanging the portion of the hardware-trust data with the hardware-trusted circuitry in the NFVI over the Nf-Vi link.

6. The method of claim 1 further comprising:
a Virtual Network Function Manager (VNFM) executing in the hardware-trusted circuitry in the NFVI;
responsive to the exchange of the network service data, the NFV MANO orchestrator exchanging service function data with the VNFM over an Or-Vnfm link to support the hardware-trusted wireless communication service; and
the VNFM exchanging the service function data with the NFV VNF executing in the hardware trusted circuitry in the NFVI over a Ve-Vnfm link to support the hardware-trusted wireless communication service.

7. The method of claim 1 further comprising:
a Virtual Network Function Manager (VNFM) executing in the hardware-trusted circuitry in the NFVI;
the NFV MANO orchestrator exchanging a portion of the hardware trust data with the VNFM over an Or-Vnfm link; and
the VNFM exchanging the portion of the hardware-trust data with the VNF executing in the hardware-trusted circuitry in the NFVI over a Ve-Vnfm link.

8. The method of claim 1 wherein the NFV MANO orchestrator exchanging the network operations data for the hardware-trusted wireless communication service with the wireless communication network comprises the NFV MANO orchestrator exchanging a VNF Forwarding Graph (VNFFG) for the hardware-trusted wireless communication service.

9. The method of claim 1 wherein the NFV MANO orchestrator exchanging the network operations data for the hardware-trusted wireless communication service comprises the NFV MANO orchestrator exchanging an Access Point Name (APN) for the hardware-trusted wireless communication service.

10. The method of claim 1 wherein the NFV VNF supports at least one of Long Term Evolution (LTE) and Wireless Fidelity (WiFi).

11. A wireless User Equipment (UE) to support a hardware-trusted wireless communication service, the wireless UE comprising:
a Network Function Virtualization Infrastructure (NFVI) having hardware-trusted circuitry configured to execute a Network Function Virtualization Management and Orchestration (NFV MANO) orchestrator;
responsive to the execution in the hardware-trusted circuitry, the NFV MANO orchestrator configured to exchange hardware trust data with a wireless communication network to maintain hardware-trust between the wireless UE and the wireless communication network;
responsive to the execution in the hardware-trusted circuitry, the NFV MANO orchestrator configured to exchange network operations data for the hardware-trusted wireless communication service with the wireless network over an Os-Nfvo link;
responsive to the exchange of the network operations data, the NFV MANO orchestrator configured to exchange network service data with the hardware-trusted circuitry in the NFVI over an Nf-Vi link to execute an NFV Virtual Network Function (VNF) to support the hardware-trusted wireless communication service; and
responsive to the exchange of the network service data, the hardware-trusted circuitry in the NFVI configured to execute the NFV VNF to support the hardware-trusted wireless communication service.

12. The wireless UE of claim 11 wherein:
the hardware-trusted circuitry in the NFVI in the wireless UE has a physically-embedded secret key; and
the NFV MANO orchestrator is configured to encode some of the hardware trust data with the physically-embedded secret key.

13. The wireless UE of claim 11 wherein the NFV MANO orchestrator is configured to exchange the hardware trust data with the wireless communication network over the Os-Nfvo link.

14. The wireless UE of claim 11 wherein:
the hardware trusted circuitry in the NFVI is configured to execute a Virtualized Infrastructure Manager (VIM);
the NFV MANO orchestrator is configured to exchange the network service data with the VIM over an Or-Vi link; and
the VIM is configured to exchange the network service data with the hardware-trusted circuitry over the Nf-Vi link.

15. The wireless UE of claim 11 wherein:
the hardware trusted circuitry in the NFVI is configured to execute a Virtualized Infrastructure Manager (VIM);
the NFV MANO orchestrator is configured to exchange a portion of the hardware trust data with the VIM over an Or-Vi link; and
the VIM is configured to exchange the portion of the hardware-trust data with the hardware-trusted circuitry in the NFVI over the Nf-Vi link.

16. The wireless UE of claim 11 wherein:
the hardware trusted circuitry in the NFVI is configured to execute a Virtual Network Function Manager (VNFM);
responsive to the exchange of the network service data, the NFV MANO orchestrator is configured to exchange service function data with the VNFM over an Or-Vnfm link to support the hardware-trusted wireless communication service; and
the VNFM is configured to exchange the service function data with the NFV VNF executing in the hardware trusted circuitry in the NFVI over a Ve-Vnfm link to support the hardware-trusted wireless communication service.

17. The wireless UE of claim 11 further comprising:
a Virtual Network Function Manager (VNFM) executing in the hardware-trusted circuitry in the NFVI;
the NFV MANO orchestrator exchanging a portion of the hardware trust data with the VNFM over an Or-Vnfm link; and the VNFM exchanging the portion of the hardware-trust data with the VNF executing in the hardware-trusted circuitry in the NFVI over a Ve-Vnfm link.

18. The wireless UE of claim 11 wherein the NFV MANO orchestrator is configured to exchange a VNF Forwarding Graph (VNFFG) for the hardware-trusted wireless communication service with the wireless communication network.

19. The wireless UE of claim 11 wherein the NFV MANO orchestrator is configured to exchange an Access Point Name (APN) for the hardware-trusted wireless communication service with the wireless communication network.

20. The wireless UE of claim 11 wherein the NFV VNF is configured to support at least one of Long Term Evolution (LTE) and Wireless Fidelity (WiFi).

* * * * *